May 19, 1936.  A. L. MATTE  2,041,008

VOLTAGE MEASURING SYSTEM

Original Filed May 12, 1931

INVENTOR
A. L. Matte
BY
ATTORNEY

Patented May 19, 1936

2,041,008

UNITED STATES PATENT OFFICE 2,041,008

VOLTAGE MEASURING SYSTEM

Andrew L. Matte, Summit, N. J., assignor to American Telephone and Telegraph Company, a corporation of New York Application May 12, 1931, Serial No. 536,881
Renewed February 20, 1935

10 Claims. (Cl. 178—69)

This invention relates to voltage measuring systems and particularly to an arrangement adapted to determine the voltage at any point of a periodic electro-motive force.

Heretofore, in the measurement of the voltage of a periodic wave, it has been customary to employ an oscillograph to obtain a trace of the wave from which the measurements may be made. That method not only has distinct disadvantages in that it requires a certain amount of time for developing, drying, printing and measuring the oscillographs, but also it is open to error due to the width of the trace upon the film and the almost unavoidable penumbra.

The present invention provides an arrangement for measuring the voltage at any point of a periodic voltage wave that is free from the disadvantages of the oscillograph mentioned above, and also possesses certain advantages over other known methods which will be pointed out hereinafter.

The invention is capable of determining indicial admittances, delineating arrival curves and wave shapes, measuring systematic and fortuitous signal distortion and transients, and measuring envelope delay.

Figure 1:
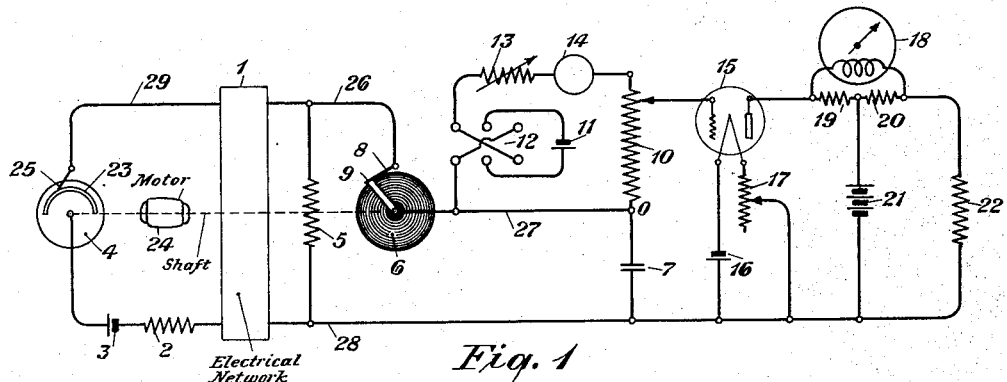

The invention will be clearly understood from the following description when read in connection with the attached drawing in which Figure 1 shows schematically a simple form of embodiment of the invention and Figs. 2, 3, 4, 5, and 6 show mechanical details that are capable of being employed when both ends of the circuit to be measured are available at the same point.

In Fig. 1, the rectangular block 1 represents a network, some property of which, such as its indicial admittance is to be measured. Connected to the input terminals of the network is a circuit containing the terminating resistance 2, a source of voltage 3, and a rotary switching device 4 by which the voltage of 3 may be suddenly applied to and removed from the network 1. Connected to the output terminals of the network 1 is a measuring circuit comprising a terminating resistance 5, one terminal of which is connected by conductor 26 to the brush 8 of a rotary switching device 6, driven synchronously with the device 4 by the shaft shown by dotted lines. The segment 9 of the disk of the switching device 6 is connected by conductor 27 to one terminal of condenser 7, the other terminal of which is connected by conductor 28 to the lower terminal of resistance 5. The voltage applied to the condenser will be the output voltage at the instant of contact of the brush 8 with the segment 9 of the said disk. The potentiometer 10 is connected to the source of potential 11 by the reversing switch 12, the connection including a variable resistance 13 and a milliammeter 14. The vacuum tube 15 has its grid connected to the potentiometer 10 and its filament to one side of the condenser 7. The filament is energized by the source of current 16, which is controlled by the resistance 17; the galvanometer 18 has its winding connected across the resistances 19 and 20. The junction of those resistances is connected to the source of plate voltage 21. The outer terminal of resistance 19 is connected to the plate of the tube 15 and, in like manner, the outer terminal of resistance 20 is connected to the resistance 22. For the purpose of description, we will assume that the disks 4 and 6 rotate synchronously and that disk 6 is capable of being adjusted upon the connecting shaft so that the point 9 may be oriented to correspond to any point on the segment 23 of disk 4.

Prior to the making of any measurement, it is necessary to adjust the resistance 22. To do so, the battery 3 is disconnected from the imput circuit of the network and the adjustable contact of the potentiometer 10 is then set upon its zero point. The disk 6 is rotated until the conductive segment 9 is under the brush 8, which adjustment connects the grid of the tube 15 to its filament. The resistance 22 is given such value that the pointer of the galvanometer 18 will indicate zero.

The source of voltage 3 is then connected to the input circuit and the motor 24 driving the two disks is set in operation. As the segment 23 moves under the brush 25, the voltage of the source 3 will be applied to the network 1 which will cause a flow of current through the network and the terminating resistance 5. A recurring surge of electromotive force will thus be produced across resistance 5, which will be directly proportional to the transfer indicial admittance of the network. That assumes, of course, that the segment 23 covers such an angle as to prevent overlapping of the currents due to successive voltage impulses. If, now, the contact segment 9 of the disk 6 is oriented with respect to any chosen point on segment 23, the voltage across the condenser 7 will rise almost instantly to the value of the electromotive force at the point of the wave transmitted through the said network and will thereafter remain constant. The condenser voltage will be applied to the grid of the tube 15 which, in turn, will produce a change in the plate current and cause the deflection of the pointer of the galvanometer 18. Thereupon, the adjustable contact point of the potentiometer is moved upwards until the voltage drop through the potentiometer, produced by the source 11, is sufficient to neutralize the effect of the voltage upon the condenser 7, which neutralization is manifested by the restoration of the galvanometer pointer to zero. The voltage across the condenser 7 will be indicated by setting the potentiometer, and will be of opposite sign. The orientation of the point 9, with respect to segment 23 of disk 4, gives the time of occurrence of the voltage just measured, with respect to the time at which the impulse was impressed on the network. The contact point 9 may now be given a different orientation and the operation just described may be repeated to obtain another measurement. Obviously, those operations may be continued for as many points on the indicial admittance curve as may be desired. Throughout the operations, the potentiometer current may be kept at its proper value by using the variable resistance 13 and the milliammeter 14.

Figure 2:
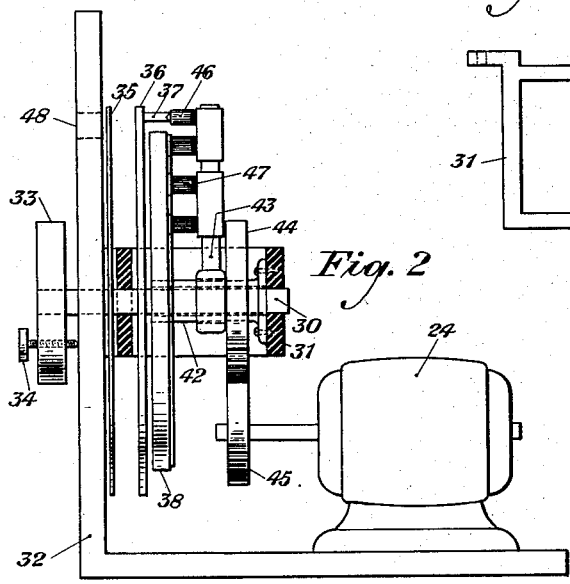
Figure 3:
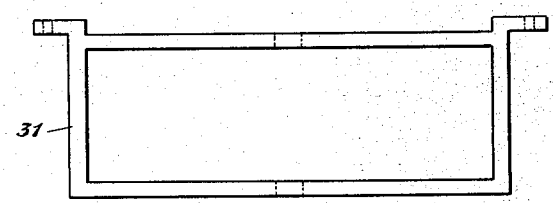
Figure 4:
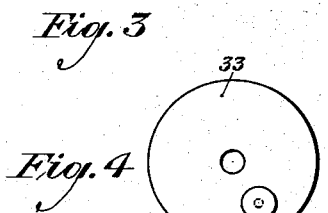
Figure 5:
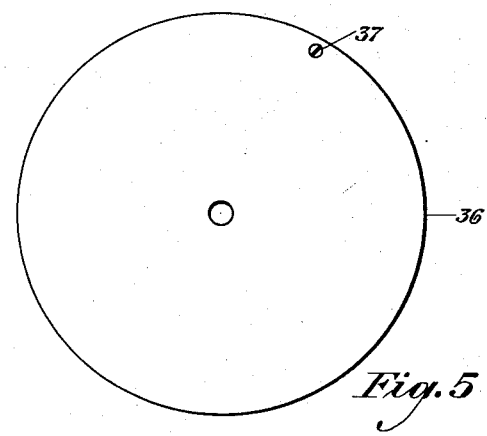
Figure 6:
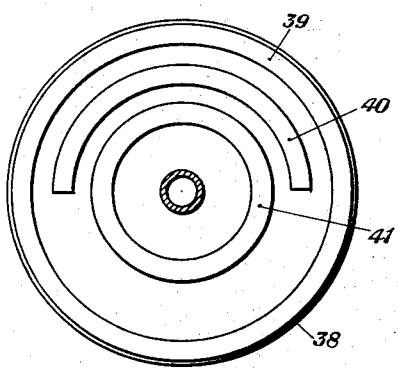

Fig. 2 shows a desirable form of rotary switching arrangement to perform the functions of the devices 4 and 6, shown schematically in Fig. 1. In Fig. 2, 30 represents a shaft that is supported by the yoke 31, shown in detail in Fig. 3, the said yoke being mounted upon the frame 32. The shaft 30 extends through the frame and carries at this outer end the milled head 33. That head is rigidly connected to the shaft and has a clamping screw 34 associated therewith by means of which the head may be held in any desired position. Also, rigidly fastened to the said shaft is a disk 35 carrying a scale visible through the window 48 of the frame 32. The disk 36, having a projecting contact point 37 is also rigidly fastened to shaft 30 so that the rotation of the head 33 effects the rotation of the disks 35 and 36. The disk 38 which carries the annular and segmental rings 39, 40 and 41 (shown in Fig. 6) is rigidly mounted at the left-hand end of the flanged sleeve 42 that is supported by the yoke 31. The brush arm 43 is rigidly connected to the gear 44, which rotates freely on the flanged sleeve 42, being driven by the motor 24 through the gear 45.

The apparatus of Fig. 2 would be connected to the circuit of Fig. 1 in the following manner: The disk 36 or at least the projecting contact 37 should be connected with the conductor 26 of Fig. 1, and the ring 39 connected with conductor 27 of that figure. As the uppermost brush 46 sweeps over contact 37, the instantaneous voltage across the resistance 5 will be impressed upon the condenser 7, which, at that instant, is effectively connected across resistance 5. The segmental ring 40 should be connected with conductor 29 of the input circuit of the network 1 and the annular ring 41 connected with the source of voltage 3. As soon as the brush 47 moves onto the segmental ring 40, the voltage of the source 3 will be applied to the network 1. The disk 38 is rigidly attached to the sleeve 42, but the disk 36 carrying the contact 37 may be freely oriented with respect to the disk 38 by turning the head 32, the relative positions of contact 37 and the beginning of segment 40 being indicated by the graduated scale on disc 35. The segmental ring 40 covers 180 degrees in the form shown in the drawing but its annular distance may be less than that.

The manner in which the invention may be employed to make measurements of the various types mentioned hereinbefore is as follows:

Determining indicial admittances

To do this accurately, it is necessary that the angle subtended by the segment 40 should be sufficient to cover the duration of growth of the impulse to what is sensibly its final value, but in no case should it (the growth of the impulse) exceed 180 degrees, as the period of decay should be equally well completed before another impulse starts. The range may, of course, be adjusted to any value desired by changing the speed of the brush arm 43. For example, if the final value is reached in 25 milliseconds or less, the segment 40 may be made 180 degrees and the brush arm 43 connected directly (by means of unity ratio gears) to a 6-pole 60-cycle synchronous motor (1200 R. P. M.). The orientation scale may be conveniently divided in milliseconds or fractions thereof (one millisecond 7.2 degrees).

Two methods present themselves for determining the indicial admittance in analytical form from the data obtained by this method: it may be computed directly from the data in the form of a power series having as many terms as there were separate points measured on the curve, or, since we are in reality sending out a periodic impulse, it may be expressed as a Fourier series.

Delineating arrival curves

The current received at the end of a submarine cable or similar structure, due to the application of a D. C. voltage at the sending end, may be analyzed in the above manner. In the case of submarine cable, where both ends are not accessible at the same point, the arrangement shown in Fig. 2 could not be employed in the manner described above. In such a case, the sending rings would be at the transmitting end and a disk containing the receiving rings would be at the receiving end, with means provided for synchronizing the rotation of the two disks carrying the respective rings. Such means are well known in the art and will not be described here.

Delineating wave shape

It is often required to study the wave shape of low frequency currents as, for instance, in interference work or in the design of generators. This has sometimes been done by taking oscillograms and measuring them to secure data for a Fourier analysis. The method herein described is well adapted to this problem, particularly where low frequency components, which cannot be readily filtered out and measured, are of interest. As an example, let us suppose that a 60-cycle electromotive force is connected between 26 and 28 in Fig. 1, all apparatus to the left of this point being disconnected, and the same current which is impressed on 5 drives the disk 36 directly by means of a 2-pole motor (3600 R. P. M.), then each revolution will correspond to one complete cycle. If now, the orientation scale is graduated in degrees, the data for a Fourier analysis may be read off directly.

Measuring systematic signal distortion

Let the segment 40 be changed to a 10-segment commutator which covers the whole face of disk 38, and have the segments so connected as to send out a C-signal. For purpose of illustration, let us take a neutral telegraph system. First send out a steady marking impulse and adjust potentiometer 10 to give one-half the electromotive force which will neutralize the marking voltage across the condenser 7, that is, let 10 be adjusted so that the galvanometer 18 will read zero when the telegraph wave has grown to one-half its final value. As disk 36 is rotated slowly, the needle of 18 will swing first to one side of zero and then to the other, the difference between the successive positions of the contact point 37 which restores the galvanometer 18 to zero gives the length of the dots and dashes.

When polar signals are used, the reversing switch 12 permits taking readings for spaces as well as for marks.

Bias can, of course, be easily checked by reversing the sending connections. If desired, the orientation scale may be graduated in hundredths of a signal unit so the results can be read directly in "per cent".

*Measuring fortuitous signal distortion*

If in the preceding measurement fortuitous distortion is present, the point of galvanometer 18 will not remain steady at zero but will oscillate unsteadily to each side of this value, due to the fact that the signals do not always build up or decay at exactly the same instant of time. By rotating the orientation disk 36 first one way and then the other until the greatest excursions of the meter pointer just reach zero, the range of fortuitous distortion can be obtained for either end of any component dot or dash of the test signal.

*Measuring transients*

When the electromotive force impressed on a network is not a direct current, the arrival curve may be computed, when the indicial admittance $A(t)$ is known.

The delay between the start of an impulse at the sending end and its growth to some predetermined value, such as one-half the final value for instance, can be found by this means also.

*Measuring envelope delay*

Envelope delay may be measured over a looped circuit at frequencies of, say, 1000 cycles by modulating a current of this frequency with a low frequency current (e. g. 25 cycles). This modulated current is then transmitted over the circuit and rectified. The 25-cycle current is then equalized in magnitude and its phase shifted for comparison with the original current of like frequency. By using the device described herein as an instantaneous voltmeter of effectively infinite impedance, the above process can be greatly simplified, as the phase relation of the envelope frequency can be compared before and after transmission without having to readjust the relative magnitude and phase; in fact, if complete modulation is used, no rectification is required at the receiving end, since the relative displacement of the zero points of the modulated waves may be compared directly at the two ends of the circuit.

While the invention has been disclosed as embodied in particular forms, it is obvious that the invention may take other forms without departing from the spirit and scope of the appended claims.

What is claimed is:

1. The method of measuring the transient characteristics of a network which consists in applying a periodic square top voltage wave to the input of the network, and measuring the magnitude at any instant of the output voltage wave of said network by nullifying its effect upon a translating device by a known voltage variable at will.

2. The method of measuring the instantaneous voltage of a periodic electromotive force which consists in picking off the voltage at any instant and storing the said voltage, indicating the magnitude of the stored voltage without causing any substantial change in the stored voltage, and neutralizing the indicated voltage by a known voltage applied in opposition to the said stored voltage.

3. The method of measuring the instantaneous voltage of a periodic electromotive force which has been impressed upon a network and transmitted thereover, which consists in effectively picking off the voltage at any point on the periodic voltage wave in the output of said network, storing the successive repititions of the picked voltage, and comparing the stored voltage to a known voltage variable at will.

4. In a voltage measuring system, the combination with a source of periodic electromotive force, of a condenser, means to apply the instantaneous voltage of the said periodic electromotive force to the said condenser, a vacuum tube, means connecting the condenser between the filament and the grid of the said tube, the connection including a direct current potentiometer so connected that its voltage opposes that of the said condenser, and a normally balanced galvanometer connected in the plate circuit of the said tube.

5. In a voltage measuring system, the combination with a source of direct current of a network, means to interruptedly apply the said direct current to the said network, a resistance bridged across the output of the said network, a condenser, means to cyclically and momentarily apply to the said condenser the voltage at any instant across the said resistance, a vacuum tube voltmeter having the grid of its tube connected to the said condenser, the connection including a direct-current potentiometer so poled that its voltage opposes that of the said condenser.

6. The null method of measuring the instantaneous value of a periodic electromotive force which consists in driving an orientatable contact in synchronism with this electromotive force, picking off the electromotive force at any point in the wave, applying it to a condenser, neutralizing the electromotive force on the condenser by a known electromotive force of equal value and ascertaining this equality by a vacuum tube device having such high input impedance as not to affect the charge on the condenser.

7. A system for observing signal distortion comprising, in combination, a device for sending a signal combination, a network to which said signal combination is applied, the said network being capable of affecting the wave shape of the said signal, a condenser, switching means connected to the output of said network and synchronized with the said sending device to apply to the said condenser a succession of voltage impulses corresponding to similar points on the wave representing the said signal combination, and a high impedance vacuum tube connected to the said condenser and having means to show the voltage across the said condenser.

8. The method of measuring the transient characteristics of a network, which consists in applying a periodic square topped voltage wave to the input of the said network, picking off the output voltage at any instant resulting from the application of the square topped wave to the said network, storing the voltage thus selected and measuring the said voltage by comparison with an ascertainable standard without affecting the voltage stored.

9. The method of measuring the transient characteristics of a network, which consists in applying a sequence of square topped voltage waves to the said network for transmission therethrough, picking off from each wave of the resulting train of output waves the voltage existing at correspondingly similar positions upon the successive output waves, storing the successive voltages thus selected, and measuring the accumulated voltages by comparison with a known standard, without materially affecting the stored voltage.

10. The method of measuring systematic signal distortion, which consists in repeatedly transmitting through a medium a signal voltage representing a dot, picking off the output voltage at a given instant and storing the voltage picked off, measuring said voltage without causing any substantial change in magnitude of the stored voltage as a result of such measurement, opposing the stored voltage by another voltage variable at will, and adjusting the variable voltage to effect half neutralization of the stored voltage, then applying dot and dash signals to the said medium for transmission thereover, picking off and storing the output voltages at the corresponding instant at which the dot signal was picked off, and determining the deviation from zero resulting therefrom, then varying the instant of picking off the said voltage until an indication of zero voltage is given, and measuring the angular variation necessary to effect such indication.

ANDREW L. MATTE.